United States Patent Office 3,766,141
Patented Oct. 16, 1973

3,766,141
POLYQUINOXALINES CONTAINING FLEXIBILIZ-
ING GROUPS IN THE POLYMER CHAIN
Joseph M. Augl, Sterling, Va., and Wolfgang J. Wrasidlo,
Mercer Island, Wash., assignors to the United States
of America as represented by the Secretary of the Navy
No Drawing. Filed Sept. 27, 1971, Ser. No. 184,194
Int. Cl. C08g 33/02
U.S. Cl. 260—47 R        9 Claims

ABSTRACT OF THE DISCLOSURE

Polyquinoxalines consisting essentially of units of the formula

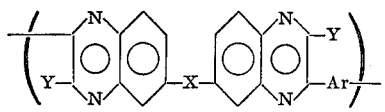

wherein Y is —$C_6H_5$ or H, Ar is m-phenylene, p-phenylene or

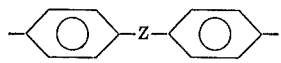

wherein Z is O, S, SO, or $SO_2$, and X is a direct bond

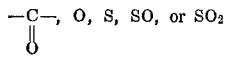, O, S, SO, or $SO_2$ provided that when X is a direct bond, O, S, SO or $SO_2$, Y is —$C_6H_5$ and Ar is

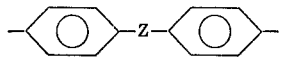

wherein Z is S, SO, or $SO_2$ and further provided that when Ar is m-phenylene, p-phenylene or

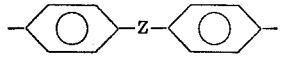

wherein Z is O, Y is —$C_6H_5$ and X is

are prepared by reacting a tetramine of the formula

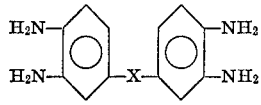

with compounds of the formula

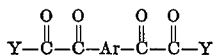

These polymers can be made into fibers or films and can be used as coatings and laminating resins.

BACKGROUND OF THE INVENTION

This invention generally relates to polymers and more particularly to polyquinoxalines.

Polyquinoxalines are known and have been described in application Ser. No. 876,572, filed Nov. 13, 1969 entitled "Phenylated Polyquinoxalines and Method of Preparation Thereof" by Wolfgang J. Wrasidlo, now abandoned. Furthermore phenylated imide-quinoxaline copolymers are also known and have been disclosed in application Ser. No. 75,248, filed Sept. 24, 1970 entitled "Phenylated Imide-Quinoxaline Copolymers and Method of Their Preparation" by Joseph M. Augl, now Pat. No. 3,642,700. Additionally, application Ser. No. 128,524 filed Mar. 26, 1971, entitled "Soluble Imide-Quinoxaline Copolymers" by Joseph M. Augl and James V. Duffy, now Pat. No. 3,642,700, also discloses similar type polymers.

Such polymers are known to have good oxidative thermal stability. Additionally some of these polymers, even those with a relatively high molecular weight, are very soluble in common organic solvents. Since these polymers can be used as protective coatings, it is highly desirable that they be easily removed by contacting with common organic solvents so that it is possible to easily inspect or repair materials which have been coated with them. A continuing search goes on for polymers which can be used as protective coatings and which have good oxidative-thermal stability as well as good solubility in common organic solvents.

SUMMARY OF THE INVENTION

Accordingly, one object of this invention is to provide polyquinoxalines.

Another object of this invention is to provide polyquinoxalines which have good oxidative-thermal stability.

Another object of this invention is to provide polymers which are easy to process into final products.

A still further object of this invention is to provide polyquinoxalines which are readily soluble in common organic solvents.

Another object of this invention is to provide polyquinoxalines which can be used as high temperature protective coatings.

Yet another object of this invention is to provide polyquinoxalines which can be formed into fibers or films.

These and other objects of this invention are accomplished by providing polymers consisting essentially of units of the formula

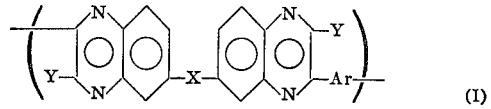   (I)

wherein Y is —$C_6H_5$ or H, ar is m-phenylene, p-phenylene or

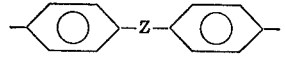

wherein Z is O, S, SO or $SO_2$, and X is a direct bond,

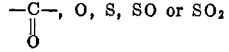, O, S, SO or $SO_2$ provided that when X is a direct bond, O, S, SO or $SO_2$, Y is —$C_6H_5$ and Ar is

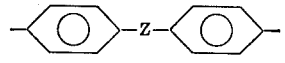

wherein Z is S, SO or $SO_2$, and further provided that when Ar is m-phenylene, p-phenylene or

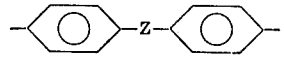

wherein Z is O, Y is —$C_6H_5$ and X is

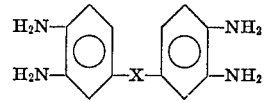

which are prepared by reacting a tetramine of the formula

   (II)

DESCRIPTION OF THE PREFERRED EMBODIMENT

The polymers of Formula I are prepared by reacting the commercially available tetraamines of Formula II with a compound of Formula III. Compounds of Formula III wherein Ar is m- or p-phenylene are well known in the art. For example, compounds of this type wherein Y is —$C_6H_5$ are disclosed in application Ser. No. 876,572 hereinbefore referred to and hereby incorporated by reference. Compounds of Formula III wherein Ar is

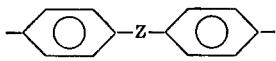

and Y is —$C_6H_5$ are not as well known and can be prepared by the following general reaction scheme.

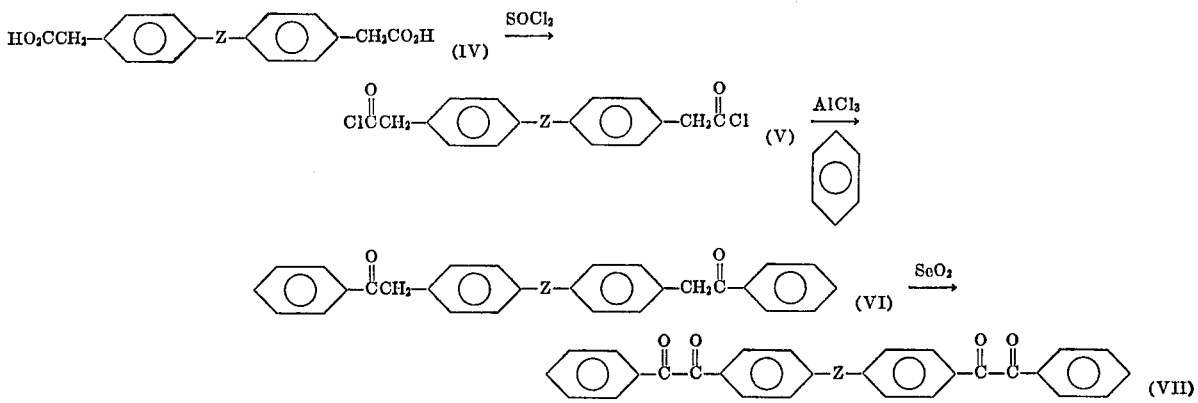

Thus a compound of Formula IV is reacted under standard conditions with thionyl chloride to form V, the acid chloride of compound IV. This product, V, is then reacted with benzene and aluminum chloride under the typical Friedel-Crafts conditions to obtain VI which is then oxidized, using $SeO_2$ as catalyst to form VII. Compounds of Formula III wherein Y is H are known in the prior art.

The polymers of this invention are prepared by solution condensation of the tetramine with the corresponding compound of the formula

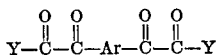

When Y was —$C_6H_5$, the condensations proceeded well at about room temperature to yield the desired products. When Y was H, however, it was necessary to use more vigorous reaction conditions due to the lower reactivity of these materials. Since the use of higher reaction temperatures is conducive to more side reactions and such side reactions form impurities which lower the solubility of the final polymer, the polymers wherein Y is —$C_6H_5$ were considerably more soluble. Thus it is desirable to conduct these polymerizations around room temperature in order to obtain more soluble final products.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Sulfonyl-4,4'-bis phenyl acetylchloride

A mixture of 36.0 g. of sulfonyl-4,4'-bisphenylacetic acid, 32 ml. of thionylchloride, and 180 ml. of chloroform was refluxed for six hours. Then the solvent was evaporated under reduced pressure and the residual oil was slowly poured into 500 ml. of hexane, giving 40.0 g. (100%) of a tan solid, M.P. 105–108° C. Without further purification, the solid was used for the next step.

EXAMPLE 2

Bis(4'-deoxybenzoinyl) sulfone

To a stirred mixture of 34.0 g. of sulfonyl-4,4'-bisphenylacetylchloride (0.92 mole) in 150 ml. of benzene was added in portions 40.0 g. (0.3 mole) of aluminum chloride. The mixture was stirred for six hours at 45° C. The content of the flask was then poured onto a mixture of ice and hydrochloric acid. The precipitated solid was filtered and thoroughly washed with water and ethanol. The product was recrystallized from glacial acetic acid to give 31.0 g. (74%) of a white material, M.P. 174–175° C.

EXAMPLE 3

4,4'-dibenzilylsulfone

A stirred mixture of 22.7 g. (0.05 mole) of bis(4'-deoxybenzoinyl) sulfone, 12.2 g. (0.11 mole) of selenium dioxide, and 150 ml. of glacial acetic acid was refluxed for six and one-half hours. Upon cooling, 18.0 g. (76%) of a white solid precipitated, M.P. 164–166° C.

EXAMPLE 4

The polyphenylquinoxalines were prepared via solution condensation according to the following general procedure:

A 100 ml. three-neck, round bottom flask, fitted with a stirrer, condenser and gas inlet tube was charged with 0.01 mole of tetramine and 50 ml. of meta-cresol. The flask was purged with nitrogen and 0.01 mole of

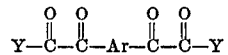

wherein Y is —$C_6H_5$ was added to the slurry at ambient temperature. A clear, viscous solution was obtained after addition was complete. Stirring was continued for about three hours. Finally the temperature was raised for 20 minutes to 200° C. to drive out the water of condensation. The polymers were isolated as fibrous granular solids by precipitating from methanol and were then redissolved in either chloroform or meta-cresol.

EXAMPLE 5

The polyquinoxalines wherein Y is H where prepared by a similar procedure. After addition of the compound of Formula III wherein Y is H to a slurry of the tetramine in meta-cresol at ambient temperature, a clear solution formed after about one hour. Upon heating to 200° C. the polymers precipitated and were isolated by quenching with methanol. The infrared spectra of the polymers at this stage of reaction showed the presence of glyoxal carbonyl bands indicating incomplete reactions. Upon further heating the polymers at 300° C. for 2 hours in the solid state under a blanket of nitrogen, the reaction was completed.

Various polymers prepared by the above methods are indicated in the following table.

TABLE

| Polymer | Y | X | Ar | Inherent viscosity (dl./q.) |
|---|---|---|---|---|
| 1 | $C_6H_5$ | Direct bond | -⌬-$SO_2$-⌬- | a 0.88 |
| 2 | $C_6H_5$ | $SO_2$ | -⌬-$SO_2$-⌬- | a 0.76 |
| 3 | $C_6H_5$ | O | -⌬-$SO_2$-⌬- | a 0.77 |
| 4 | $C_6H_5$ | $\overset{\text{O}}{\underset{\|}{\text{C}}}$ | p-Phenylene | b 2.06 |
| 5 | $C_6H_5$ | $\overset{\text{O}}{\underset{\|}{\text{C}}}$ | -⌬-O-⌬- | b 1.45 |
| 6 | $C_6H_5$ | $\overset{\text{O}}{\underset{\|}{\text{C}}}$ | -⌬-$SO_2$-⌬- | b 1.03 |
| 7 | H | $\overset{\text{O}}{\underset{\|}{\text{C}}}$ | p-Phenylene | b 0.85 |
| 8 | H | $\overset{\text{O}}{\underset{\|}{\text{C}}}$ | -⌬-O-⌬- | b 0.55 |
| 9 | $C_6H_5$ | $SO_2$ | p-Phenylene | b 1.68 |
| 10 | $C_6H_5$ | $SO_2$ | -⌬-⌬- | b 1.47 | a Determined in m-cresol (0.5 g. in 100 ml. at 30° C.).
b Determined in 98% sulfuric acid (0.5 g. in 100 ml. at 30° C.).

Polymers wherein Y is —$C_6H_5$ are preferred because they have extremely good solubility in common organic solvents. Thus polymers 4, 5 and 6 in the table are soluble in phenolic solvents such as m-cresol and m-methoxyphenol as well as chlorinated solvents such as chloroform and tetrachloroethane in concentrations up to 20 percent. Likewise polymers 1-3, 9 and 10 in the table also possess relatively good solubility in chloroform, tetrachloroethane, m-cresol and m-methoxyphenol.

The molecular weight range of the useful polymers of this invention may vary from polymers which have an inherent viscosity of between about 0.5 to about 2.5 dl./g. either as a 0.5 g. in 100 ml. solution in 98% sulfuric acid at about 30° C. or as a 0.5 g. in 100 ml. of m-cresol solution at 30° C.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A polyguinoxaline consisting essentially of units of the formula

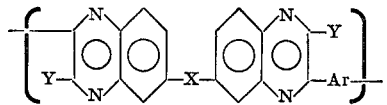

wherein Y is selected from the group consisting of —$CH_5H_5$ and H, Ar is selected from the group consisting of m-phenylene, p-phenylene and

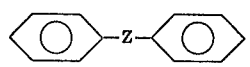

wherein Z is selected from the group consisting of O, S, SO and $SO_2$ and X is

which have an inherent viscosity of about 0.5–2.5 dl./g. as a 0.5 g. in 100 ml. solution in 98% sulfuric acid at about 30° C.

2. The polymer of claim 1 wherein Ar is selected from the group consisting of p-phenylene and

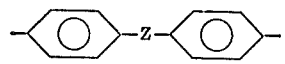

wherein Z is selected from the group consisting of O and $SO_2$.

3. The polymer of claim 2 wherein Y is —$C_6H_5$ and Ar is p-phenylene.

4. The polymer of claim 2 wherein Y is —$C_6H_5$ and Ar is

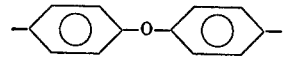

5. The polymer of claim 2 wherein Y is —$C_6H_5$ and Ar is

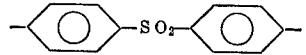

6. The polymer of claim 2 wherein Y is H and Ar is p-phenylene.

7. The polymer of claim 2 wherein Y is H and Ar is

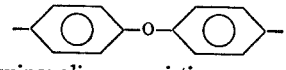

8. A polyquinoxaline consisting essentially of units of the formula

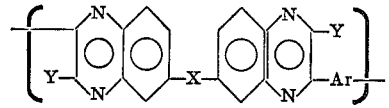

wherein Y is —$C_6H_5$, Ar is

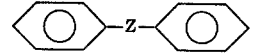

wherein Z is selected from the group consisting of S, SO and $SO_2$ and X is $SO_2$, which have an inherent viscosity of about 0.5–2.5 dl./g. as a 0.5 g. in 100 ml. solution in 98% sulfuric acid at about 30° C.

9. The polymer of claim 8 wherein Ar is
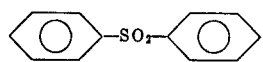
References Cited
UNITED STATES PATENTS
3,642,700    2/1972    Augl _____ 260—50
3,661,850    5/1972    Stille _____ 260—50
OTHER REFERENCES
Hergenrother et al.: J. Polym. Sci. A–1, 5, 1453–66 (1967).
MELVIN GOLDSTEIN, Primary Examiner
U.S. Cl. X.R.
260—49, 63 R, 79.3 M